United States Patent [19]
Kasiraj et al.

[11] Patent Number: 5,204,812
[45] Date of Patent: Apr. 20, 1993

[54] USER ACCESS OF MULTIPLE DOCUMENTS BASED ON DOCUMENT RELATIONSHIP CLASSIFICATION

[75] Inventors: Chander Kasiraj, Grapevine; James L. Taylor, Coppell, both of Tex.; Timothy J. Wolf, Raleigh, N.C.

[73] Assignee: International Business Machines Corp., Armonk, N.Y.

[21] Appl. No.: 823,085

[22] Filed: Jan. 15, 1992

Related U.S. Application Data

[63] Continuation of Ser. No. 430,846, Nov. 2, 1989, abandoned.

[51] Int. Cl.[5] .............................................. G06F 15/38
[52] U.S. Cl. ................................................. 364/419
[58] Field of Search ................. 364/419; 395/144–146, 395/148

[56] References Cited

PUBLICATIONS

"Handy Guide To Orbit".

Primary Examiner—Gail O. Hayes
Attorney, Agent, or Firm—David A. Mims, Jr.; James H. Barksdale

[57] ABSTRACT

A method for classifying and accessing a collection of documents as a single document entity. Relationships are formed between the collection of documents in a relational manner. Each individual document relationship is assigned a document relationship classification independent of the document. The relationship classification contains sensitivity attributes in addition to specific information which relates the documents to a part of a particular set. Access to documents is based on the requester's credentials as well as a calculated relationship classification based on the sensitivity attributes.

8 Claims, 2 Drawing Sheets

USER ACCESS OF MULTIPLE DOCUMENTS BASED ON DOCUMENT RELATIONSHIP CLASSIFICATION

This application is a continuation of Ser. No. 430,846 filed on Nov. 2, 1989, now abandoned.

FIELD OF THE INVENTION

The present invention relates to restricting user access to a document, and more particularly, restricting user access to a plurality of documents which are accessed, viewed, and managed as a single document entity.

BACKGROUND OF THE INVENTION

In electronic office systems, a document may frequently be shared or accessed by many users. A document classifications permits such a document to be shared or accessed only by users having proper credentials. When there is a single document, any document classification is based on the document and is therefore dependent on that document. Problems occur when a collection of documents are formed into a single document entity. Since document classification is dependent on individual documents, there is presently no method whereby users can access, view and manage a collection of documents as a single document entity.

One prior art document classification method utilizes a defacto classification of documents based on their business use. For example, a customer's loan folder could consist of such documents as a "loan application", "credit history", "loan insurance" and "payment history". Users requiring access to the documents in the customer's loan folder might consist of a clerk and a loan officer. A system administrator would set up allowable document labels for each user as well as the retention periods for particular users. In this example, the loan officer might need a copy of the "loan application" for up to three years after the loan is paid. Therefore, the system administrator would set up allowable document labels for the loan officer's use of the "loan application" along with a retention period set to expire three years after the loan is paid. In the same manner, a clerk working with the same "loan application" would need the document around only while the account is active. Again, the system administrator would set up allowable document labels along with a retention period based on the clerk's requirements. This document classification method allows protection of the documents based on the user or the business use of the document.

The users are permitted to assign private-use labels in the place of the allowable document labels set up by the system administrator. Therefore, a user can change the retention period or ownership expiration data of the document. However, this document classification method will not permit users to access, view, and manage the customer's loan folder as a single document entity composed of "loan application", "credit history", "loan insurance", and "payment history" documents. This results from a document classification that is dependent on individual documents within the customer's loan folder. Any attempted document combination would cause each of the individual documents to lose its identity and would limit user access to the overall document classification given the customer's loan folder.

Consequently, what is needed is a technique for classifying a collection of documents based on their relationships between each other, so that users can access, view, and manage the documents as a single entity.

SUMMARY OF THE INVENTION

This invention relates to a method of allowing documents to retain a classification based on a collection of documents. A linear relationship between two documents is defined such that one document becomes a head document and the other a tail document. The combined documents are designated members of a set and assigned a classification attribute. The classification attribute contains sensitivity attributes for the relationship between the documents. Additional documents may be added to the set through new linear relationships to form a chain of documents. Each additional document added to the set results in a new classification attribute. Document classification is accomplished by calculating all possible pairings of documents in the set based on the sensitivity attributes. A single document classification is therefore generated for the collection of documents which may be compared to a user's credential for accessing the documents.

DETAILED DESCRIPTION

This invention provides a method of accessing, viewing, and managing a collection of documents as a single document entity. Document relationships are created between each individual document indicating an association, dependency, or link between the documents. This invention utilizes a linear document relationship between documents accomplished by stapling one document to another document. The concept of creating a linear document relationship through a staple relationship was originally conceived by M. G. MacPhail and disclosed in co-pending application Ser. No. 277,369 entitled "A Method of Filing Stapled Documents Within an Application", and is incorporated herein by reference.

Figure 1:
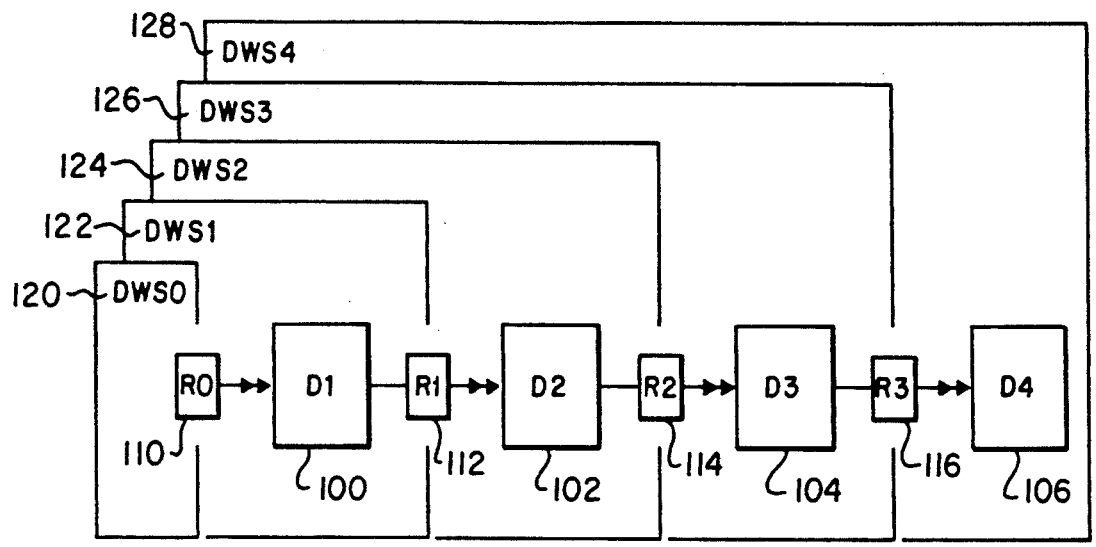
FIG. 1 illustrates a collection of documents capable of management as a single document entity.

For the purpose of this invention, "staple" refers to the process by which one document is related to another in a linear relational fashion. In this relationship, when two documents are stapled together, a document relation exists between these two documents, one as a stapler and the other as a staplee. The stapler is a document that is being stapled to another while the staplee is a document that is being stapled by another. This concept is more clearly illustrated by turning to FIG. 1. Documents D1 designated by reference numeral (100), D2 designated by reference numeral (102), D3 designated by reference numeral (104), and D4 designated by reference numeral (106) represent all the documents in a collection of related documents. Any collection of related documents will be referred to as a document set for the purpose of this invention. Document D1 (stapler) 100 is stapled to D2 (staplee) 102, document D2 (stapler) 102 is stapled to D3 (staplee) 104, etc. The relationship created when the stapler/staplee relationship exists is called a document relationship. This document relationship specifies the relational attributes for a document. In FIG. 1, documents D1 (100), D2 (102), D3 (104), and D4 (106) form a chain. One document, D1 (100), is the head and another document, D4 (106), is the tail of the chain. Under this invention, it is not permissible to have a loop where a document is both the head and the tail. Document D1 (100) is therefore defined as the document set head representing the first document in a document set and having the designation of a stapler. In the same way, document D4 (106) is the document set tail and is the last document in the document set having the designation of staplee. When one or more documents are combined as defined by this invention, a document working set is created.

Each document [D1 (100), D2 (102), D3 (104), and D4 (106)] in the collection of related documents has a document relation classification set [R0 designated by reference numeral (110), R1 designated by reference numeral (112), R2 designated by reference numeral (114), and R3 designated by reference numeral (116)]. This document relation classification set (RCS) defines a classification weight in relation to other related documents in the document set. A classification attribute can be therefore be assigned for each document relation in the chain. The relation classification set, R0, R1, R2, and R4, contains not only sensitivity attributes for a given relationship between two documents, it also specifies information that can relate these documents to be part of a document working set. The relation classification set can be used to quickly calculate a document working set for a given document. In summary, the relation classification set [R0 (110), R1 (112), R2 (114), R3 (116)] is the means by which a document set can be accessed and managed for a given user classification.

In addition to having a relation classification set, each document set contains document working sets [DWS0 designated by reference numeral (120), DWS1 designated by reference numeral (122), DWS2 designated by reference numeral (124), DWS3 designated by reference numeral (126), and DWS4 designated by reference numeral (128)]. The Document Working Set (DWS) defines one or more documents within a document set, starting from a head. As illustrated in FIG. 1, a document set may contain many Document Working Sets, DWS0 (120), DWS1 (122), DWS2 (124), DWS3 (126), and DWS4 (128). A document set may contain one or more Document Working Sets based on the Document Relation Classification Set of all documents in the document set.

Figure 2:
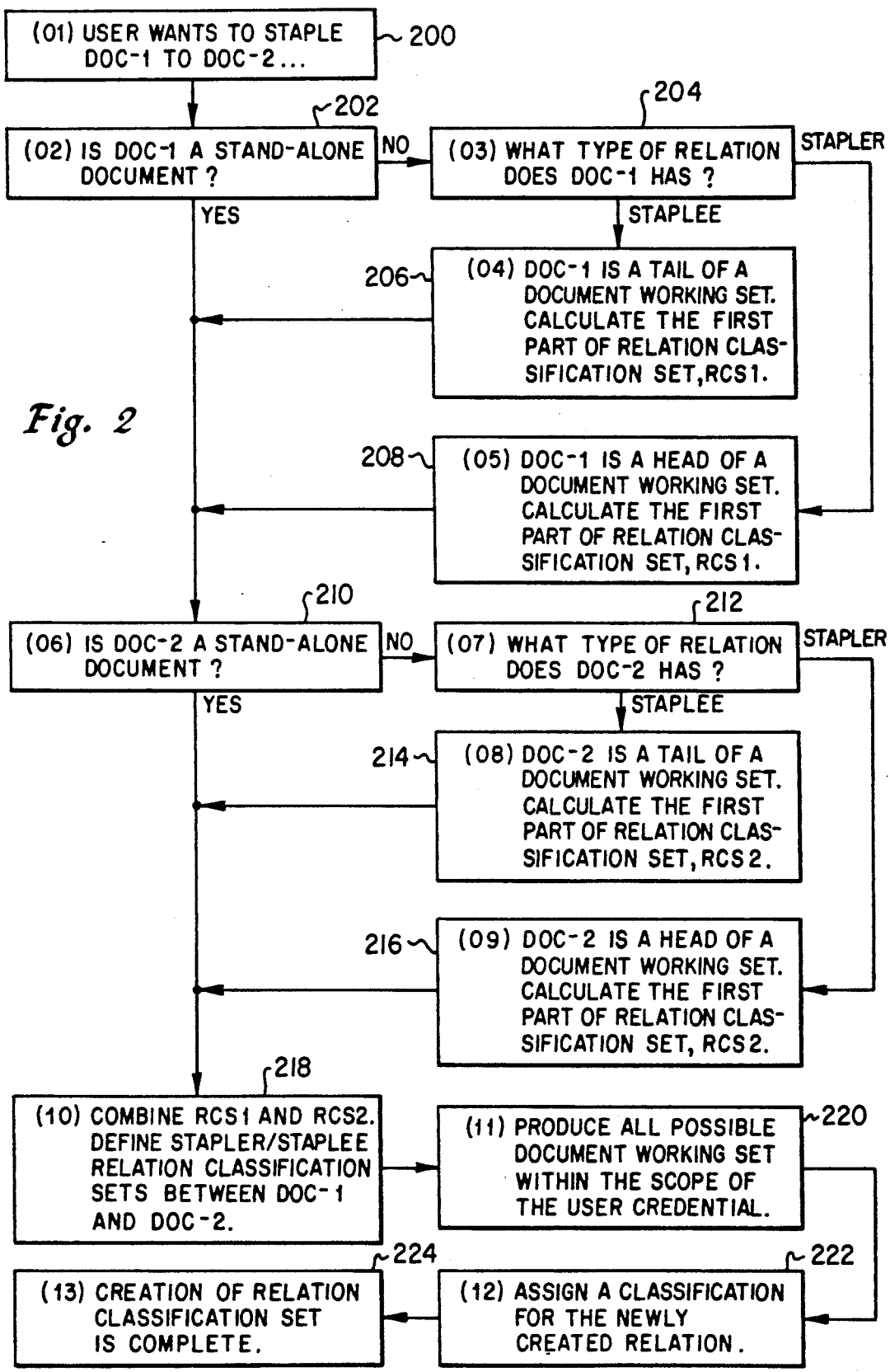
FIG. 2 is a flow-diagram showing the steps for creating a document relationship classification.

A description of how the Relation Classification Sets [R0 (110), R1 (112), R2 (114), and R3 (116)] are created will now be given. Turning to FIG. 2, a flow chart is given showing the steps required to produce the Relation Classification Sets. The user must first decide if two documents should share a linear document relation, that is whether two documents should be stapled. If the user decides to staple two documents (Doc-1 and Doc-2) 200, an inquiry whether the first document, Doc-1, is a stand-alone document 202 must be made. If the first document is found to be a stand-alone document, that is, it does not contain its own subsets of documents, the same inquiry must be made of the second document, Doc-2, 210. If both Doc-1 and Doc-2 are found to be stand-alone documents, a stapler/staplee Relation Classification Set is defined between the documents 218. The next step 220, requires the production of all possible Document Working Sets (DWS) within the scope of the user's credentials. After the Document Working Sets are created, a classification is assigned for the newly created relationship 222. The creation of Relation Classification Sets is complete after the assignment of the classification 224.

If either Doc-1 or Doc-2 are found not to be stand-alone documents, additional steps are required to form the Relation Classification Set. These steps will now be described. The initial query centers on the type of relationship between Doc-1 and the sub-set of related documents 204. As previously indicated, documents may have the linear relationship describing stapler or staplee documents. If Doc-1 is designated a stapler, it becomes the head of the Document Working Set 208. Calculation of the first part of the Relation Classification Set takes place and the process continues with an examination of Doc-2, the next potential stand-alone document 210. If Doc-1 had been designated a staplee, it would become a tail of the sub-set documents 206. The Relation Classification Set would have to be calculated as in the case when Doc-1 was designated the stapler or head of a Document Working Set.

After calculating the Relation Classification Set for the first document, the second document must be examined 210. Again we determine the type of relationship the document, Doc-2, has with the sub-documents. If the second document is a stapler, it becomes the head of the Document Working Set and the first part of the Relation Classification Set, RCS2, is calculated 216. Alternatively, if the second document is a staplee, it becomes a tail of the Document Working Set and again the first part of the Relation Classification Set (RCS2) is calculated 214. The process continues from this point with the same steps required when both documents, Doc-1 and Doc-2, were stand-alone documents. These steps consist of:

1. Combining the Relation Classification Sets between Doc-1 and Doc-2 218.
2. Producing all possible Document Working Sets within the user's credentials 220.
3. Assigning a classification for the newly created relationship 222.

Using the previously described document classification scheme, a method will be described that allows a user to access or act on a particular document. This is achieved through a classification level assigned to a specific user. The user's classification dictates the level of access to a specific document based on staple classification in the logical organization of the document. The staple classification may limit or prevent actions on a stapled document even though the individual classification of each document is permitted under the user's classification level is the documents are stand-alone. This access method allows an assignment of higher classifications when two lower classified documents are stapled. However, it should be noted that the staple relationship may not have a lower classification than the classification assigned for each stapled documents.

Figure 3:
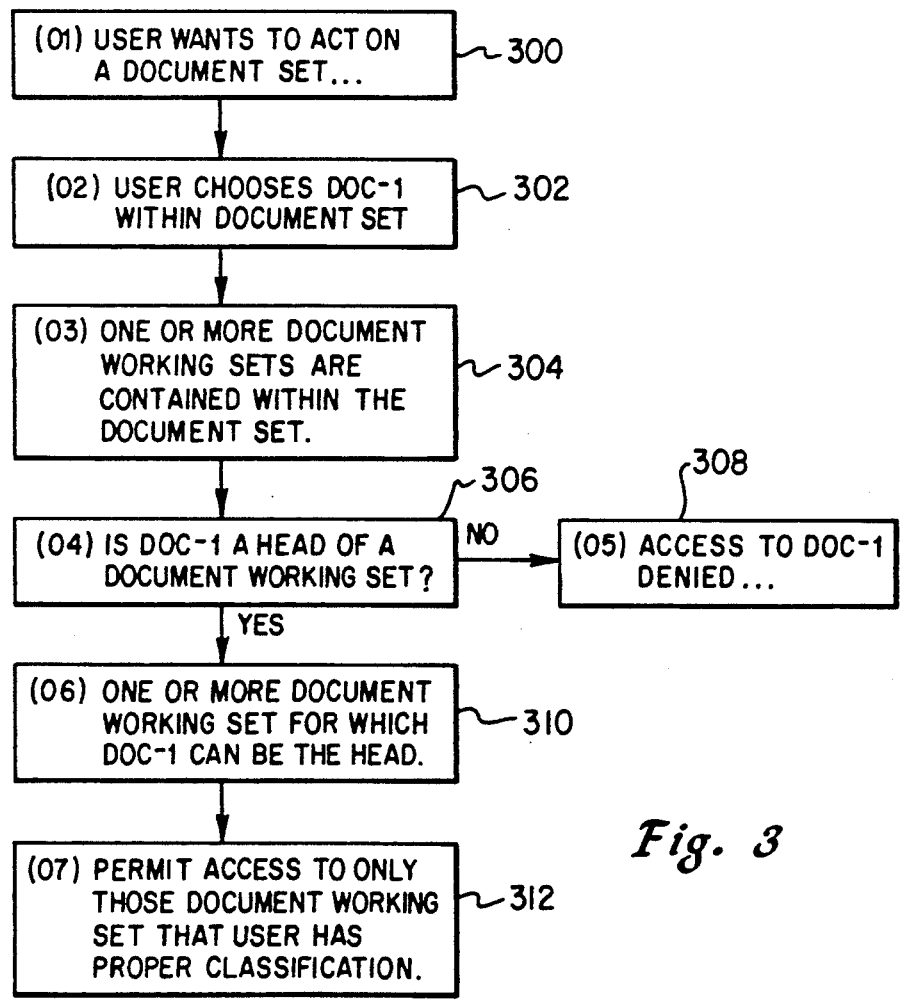
FIG. 3 is a flow-diagram showing the technique for accessing documents created using the document relationship classification.

The method is more clearly described by FIG. 3. The user decides some action is desired on a document set 300. The user indicates a particular document (i.e., Doc-1) within the document set upon which he intends to act 302. If one or more Document Working Sets is contained within the requested document set 304, another question must be asked. This question is a prerequisite to granting the user access to the document set. The question is whether the requested document, Doc-1, is the head of a Document Working Set 306. If the document, Doc-1, is not the head of a Document Working Set, user access will be denied 308. However, if the requested document is the head of one or more Document Working Sets 310, user access will be permitted to only those documents where the user has proper classification 312.

In summary, this invention allows documents to retain a classification based on a collection of documents. Linear relationships are formed by pairing documents within the collection of documents. Each pairing results in a document becoming a head document and the other a tail document. The document pairings are identified as members of a set and each of the document pairings is assigned a classification attribute. The classification attribute contains sensitivity attributes for the relationship between the documents as well as information identifying other documents that are members of the set. The documents within the set are formed into a chain of documents with the designation of either a head document or tail document. Document classification is accomplished by calculating a single classification for the chain of documents based on the sensitivity attributes of each of the individual pairings. User access is granted to the chain of documents by comparing the user's credentials with the single classification calculated for the chain of documents.

While the invention has been particularly shown and described with reference to preferred embodiments thereof, it will be understood by those skilled in the art that various changes in form and details may be made therein without departing from the spirit and scope of the invention.

What I claim is:

1. A method of classifying a plurality of documents into a single document entity within an electronic office system, where said single document entity is capable of being shared by users having proper credentials, comprising the steps of:
   defining a plurality of staple relationships between said plurality of documents to be classified within said single document entity;
   creating a plurality of relation classification sets containing sensitivity information by combining said plurality of staple relationships; and
   producing a document set having at least one document working set created from said plurality of relation classification sets.

2. A method of accessing a plurality of documents as a single document entity in an electronic office system, and where said plurality of documents are classified in a relational manner in a document set comprising the steps of:
   requesting one of said plurality of documents from said document set;
   determining if said requested document is a head document of a document working set;
   denying access when said document is not the head of said document working set;
   granting access when said document is the head of a document working set and meets a user's classification.

3. A method of classifying a plurality of related documents in a relational manner in a system where users access, view and manage said plurality of related documents as a single document entity, comprising the steps of:
   establishing a linear relationship between a first document and a second document existing within said plurality of related documents;
   defining a head document and tail document as a result of said linear relationship; and
   designating said head document and tail document as members of a set comprising said single document entity and assigning a classification attribute containing sensitivity information for said linear relationship.

4. A method of classifying a plurality of related documents in a relational manner according to claim 3 wherein said head document is the first document in a chain and said second document is the last document in said chain.

5. A method of accessing a plurality of documents as a single document by a user in a data processing means, comprising:
   stapling each of said plurality of documents together to form a chain of related documents having a head document and a tail document, said head document accessible by said user as said single document;
   assigning a single classification weight to said chain of related documents based on a classification weight of each of said plurality of documents in said chain; and
   granting access to said user having a corresponding classification weight equal to said single classification weight.

6. A method of combining a plurality of documents into a group of related documents in a data processing means, said group of related documents accessible by a user as a single document in said data processing means, comprising:
   stapling a first document to a second document to form said group of related documents, said first document representing a head document in said group of related documents and said second document representing a tail document in said group of related documents;
   assigning a classification weight to said first document and a classification weight to said second document in said group of related documents; and
   combining said first and second classification weight into a single class weight for said group of related documents to reflect a combined weighting of said group of related documents.

7. A method of combining a plurality of related documents into a group of related documents in a data processing means as recited in claim 6, further comprising the step of:
   permitting access to said group of related documents as said single document by said user when said combined classification weighting for said group of related documents is equaled to a corresponding classification weight assigned said user.

8. A method of combining a plurality of related documents into a group of related documents in a data processing means as recited in claim 6, wherein said assigning step includes the step of providing a numerical value as a classification weight for said first document and a numerical value as a classification weight for said second document in said chain of related documents.

* * * * *